US010926697B2

(12) United States Patent
Udo

(10) Patent No.: US 10,926,697 B2
(45) Date of Patent: Feb. 23, 2021

(54) SWITCH STRUCTURE

(71) Applicant: HONDA MOTOR CO., LTD., Tokyo (JP)

(72) Inventor: Takeshi Udo, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/821,748

(22) Filed: Mar. 17, 2020

(65) Prior Publication Data

US 2020/0307451 A1   Oct. 1, 2020

(30) Foreign Application Priority Data

Mar. 29, 2019 (JP) .............................. JP2019-066584

(51) Int. Cl.
| | |
|---|---|
| *B60Q 3/51* | (2017.01) |
| *B60Q 3/64* | (2017.01) |
| *H01H 9/02* | (2006.01) |
| *B60R 21/00* | (2006.01) |
| *B60Q 3/70* | (2017.01) |
| *B60R 16/00* | (2006.01) |
| *H04L 29/08* | (2006.01) |
| *H01H 9/16* | (2006.01) |

(52) U.S. Cl.
CPC ................ *B60Q 3/64* (2017.02); *B60Q 3/51* (2017.02); *B60Q 3/70* (2017.02); *B60R 16/005* (2013.01); *B60R 21/00* (2013.01); *H01H 9/02* (2013.01); *B60R 2021/0027* (2013.01); *H01H 9/161* (2013.01); *H01H 2009/0292* (2013.01); *H04L 67/12* (2013.01)

(58) Field of Classification Search
CPC ... B60Q 3/54; B60Q 3/51; B60Q 3/57; H01G 9/02; H01G 2009/0292
USPC .......................................................... 362/459
See application file for complete search history.

(56) References Cited

U.S. PATENT DOCUMENTS

| | | | | |
|---|---|---|---|---|
| 5,898,392 A | * | 4/1999 | Bambini | .................... B60R 1/12 340/996 |
| 2015/0353005 A1 | * | 12/2015 | Hodgson | .................. B60Q 3/64 345/156 |
| 2018/0308648 A1 | * | 10/2018 | Fujita | ..................... H01H 13/04 |

FOREIGN PATENT DOCUMENTS

JP            2018-185915            11/2018

* cited by examiner

*Primary Examiner* — Christopher M Raabe
(74) *Attorney, Agent, or Firm* — Rankin, Hill & Clark LLP

(57) ABSTRACT

The switch structure provided in a control device of a vehicle ceiling part comprises a cover that is openable and closable between a closed position to cover a switch and an opened position to open the switch, and in the cover, a region that covers an operation surface of an operation element of the switch in at least the closed position is formed of a member that transmits light, and the cover has a top surface comprising an inclined portion inclined at an upward gradient from a vehicle front toward a vehicle rear in the closed position.

10 Claims, 6 Drawing Sheets

SWITCH STRUCTURE

INCORPORATION BY REFERENCE

The present application claims priority under 35 U.S.C. § 119 to Japanese Patent Application No. 2019-066584 filed on Mar. 29, 2019. The content of the applications is incorporated herein by reference in its entirety.

BACKGROUND OF THE INVENTION

Field of the Invention

The present invention relates to a switch structure.

Description of the Related Art

Heretofore, a control device provided in a ceiling part near a rear-view mirror of a vehicle has been known. This control device comprises an arrangement surface, and in the arrangement surface, a plurality of switches are provided to perform operations or the like of various types of equipment mounted in a vehicle.

Furthermore, this control device may comprise, as one of these switches, an emergency call switch to report to police, fire department or the like in case of emergency. This emergency call switch may have an operation surface of an operation element of the emergency call switch that is covered with a cover to prevent an incorrect operation in case of non-emergency.

This cover is formed of a transparent member so that the operation surface of the operation element in the cover can be visually recognized. Furthermore, as the cover, a cover having a top surface provided at about the same gradient as in the arrangement surface of the control device is known (e.g., see Japanese Patent Laid-Open No. 2018-185915).

However, in a case where a top surface of a cover is provided at about the same gradient as in an arrangement surface of a control device, the top surface of the cover reflects external light such as sunlight, and due to this reflected light, an emergency call switch on an inner side of the cover cannot be visually recognized by an occupant of a vehicle.

It is an object of an aspect of the present invention to provide a switch structure that can inhibit a cover from reflecting light to an occupant.

SUMMARY OF THE INVENTION

According to an aspect of the present invention, provided is a switch structure provided in a control device of a vehicle ceiling part, comprising a cover that is openable and closable between a closed position to cover a switch and an opened position to open the switch, characterized in that in the cover, a region that covers an operation surface of an operation element of the switch in at least the closed position is formed of a member that transmits light, and the cover has a top surface comprising an inclined portion inclined at an upward gradient from a vehicle front toward a vehicle rear in the closed position.

The aspect of the present invention is characterized in that in the switch structure, the cover is formed of a member that entirely transmits light.

The aspect of the present invention is characterized in that in the switch structure, the control device comprises a protruding portion that protrudes inward in a vehicle width direction on each of opposite sides in the vehicle width direction, the cover comprises a fitting portion that engages with and holds the protruding portion, and the cover is openable and closable about the protruding portion that serves as a rotary shaft.

The aspect of the present invention is characterized in that in the switch structure, the cover comprises a protruding portion that protrudes outward in a vehicle width direction on each of opposite sides in the vehicle width direction, the control device comprises a fitting portion that engages with and holds the protruding portion, and the cover is openable and closable about the protruding portion that serves as a rotary shaft.

The aspect of the present invention is characterized in that in the switch structure, the protruding portion comprises a second inclined portion inclined at an upward gradient from an outer side toward an inner side in the vehicle width direction.

The aspect of the present invention is characterized in that in the switch structure, the control device comprises a stopper that comes in contact with the cover in the opened position on a vehicle front side of the operation element.

The aspect of the present invention is characterized in that in the switch structure, in the operation surface, a display through which light is transmittable is provided, and on a back side of the operation surface, a light source that illuminates the display is provided.

The aspect of the present invention is characterized in that in the switch structure, the cover has a plate thickness decreased toward the vehicle front.

The aspect of the present invention is characterized in that in the switch structure, the switch is inclined at an upward gradient from a vehicle front toward a rear.

The aspect of the present invention is characterized in that in the switch structure, the switch is an emergency call switch.

According to an aspect of the present invention, a cover can be inhibited from reflecting light to an occupant.

DETAILED DESCRIPTION OF THE PREFERRED EMBODIMENT

Hereinafter, an embodiment of the present invention will be described with reference to the drawings.

Figure 1:
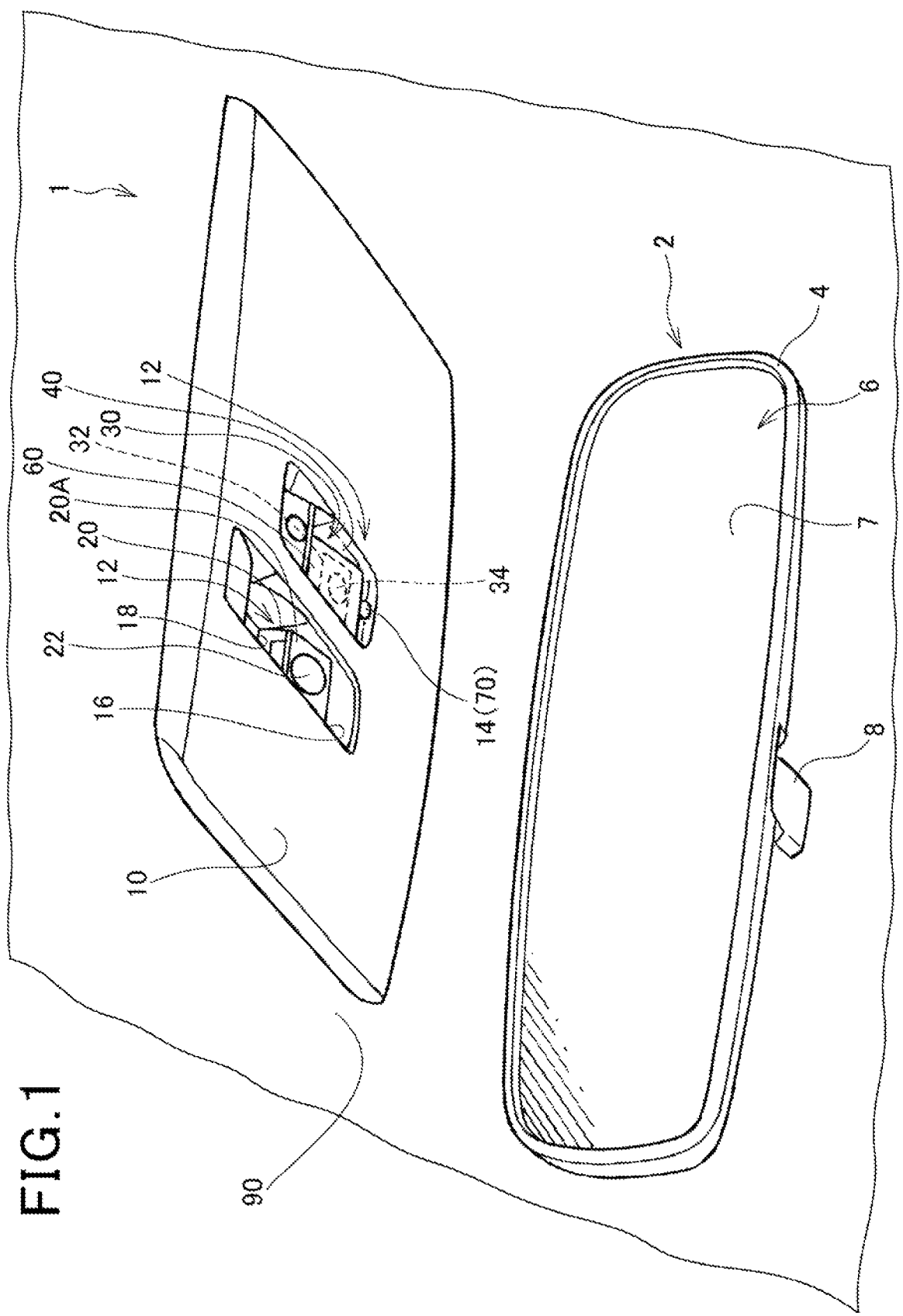
FIG. 1 is a perspective view of a control device according to an embodiment of the present invention.

FIG. 1 is a perspective view of a control device 1 according to the embodiment of the present invention. Note that for convenience of description, FIG. 1 only shows one switch 12 and an emergency call switch 30 in the control device 1.

As shown in FIG. 1, the control device 1 is a device provided in a ceiling part 90 of a vehicle such as a car, to operate various types of equipment mounted in the vehicle.

The control device 1 of the present embodiment is provided near a rear-view mirror 2 provided in the vehicle ceiling part 90. Specifically, the control device 1 is provided above the rear-view mirror 2, a dashboard, an instrument panel and others, and disposed at a position ahead of an occupant in the vehicle. Furthermore, the control device 1 is disposed at the position that is close to the rear-view mirror 2 between the rear-view mirror 2 and the occupant.

The control device 1 comprises an operation panel 10, a plurality of switches 12, and an indicator 14.

The operation panel 10 forms a front surface of the control device 1, and the operation panel 10 is provided to face an interior space of the vehicle. In the operation panel 10, a plurality of operation element storage parts 16 are provided. Each of the operation element storage parts 16 is formed in a recess shape dented from the operation panel 10 toward the vehicle ceiling part, and the operation element storage part 16 has a bottom surface including an opening 18 that is a through hole.

Figure 3:
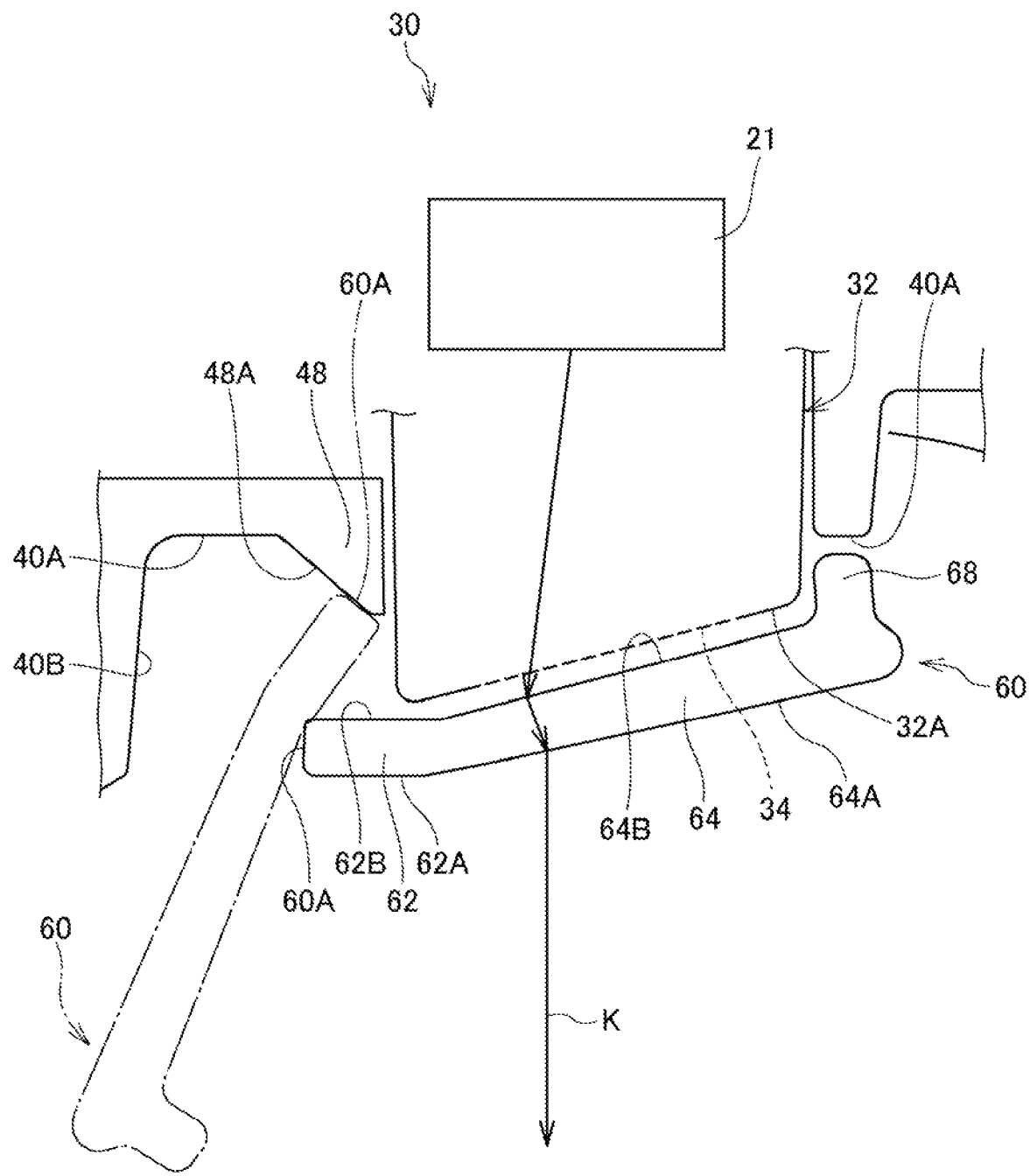
FIG. 3 is a longitudinal cross-sectional view taken along the III-III line of FIG. 2.

The plurality of switches 12 are operated by the occupant to actuate the respective types of equipment, and each of the switches 12 comprises an operation element 20 and a light source 21 (FIG. 3). The operation element 20 of the present embodiment is a knob. Each operation element 20 is inserted into each opening 18 from a rear surface toward a front surface of the operation panel 10, to protrude from the operation panel 10. Note that the operation element 20 protrudes from the opening 18 with a height dimension smaller than a height dimension of a dent of the operation element storage part 16 to such an extent that the operation element does not protrude outward from the dent.

A display 22 is provided in an operation surface 20A located in a top surface of each operation element 20. Each display 22 is molded in a form of a letter or a symbol representing the equipment actuated or an operation generated by operating each switch 12 or the like. Each display 22 is formed of a member through which light is transmittable.

The light source 21 is provided at a position located in a rear surface (a back side) of the operation element 20 of each switch 12, and the light source 21 is configured to illuminate the display 22 from the rear surface of the operation element 20. In the light source 21 of the present embodiment, an LED is for use. Note that the light source 21 is not limited to the LED, and may be, for example, a halogen lamp.

Illumination light from the light source 21 is transmitted through the display 22 and emitted to an interior space of the vehicle. Consequently, the occupant can visually recognize each switch 12 and the operation or the like generated by operating each switch 12 even in a dark place.

The indicator 14 is a display device disposed near the predetermined switch 12, to indicate, to the occupant, a state of each type of equipment mounted in the vehicle or a state of the switch 12, and comprises a light emitter 70.

The light emitter 70 includes an LED. Note that, not limited to the LED, the light emitter 70 may include, for example, a lamp. The light emitter 70 is configured to turn the light on or off, blink, or change emission color in accordance with an operation situation or a use state of the predetermined switch 12, a state of the equipment actuated by operating the emergency call switch 30, and/or the like. The light emitter 70 is provided in the operation panel 10. In the present embodiment, the light emitter 70 is provided near the emergency call switch 30.

Figure 2:
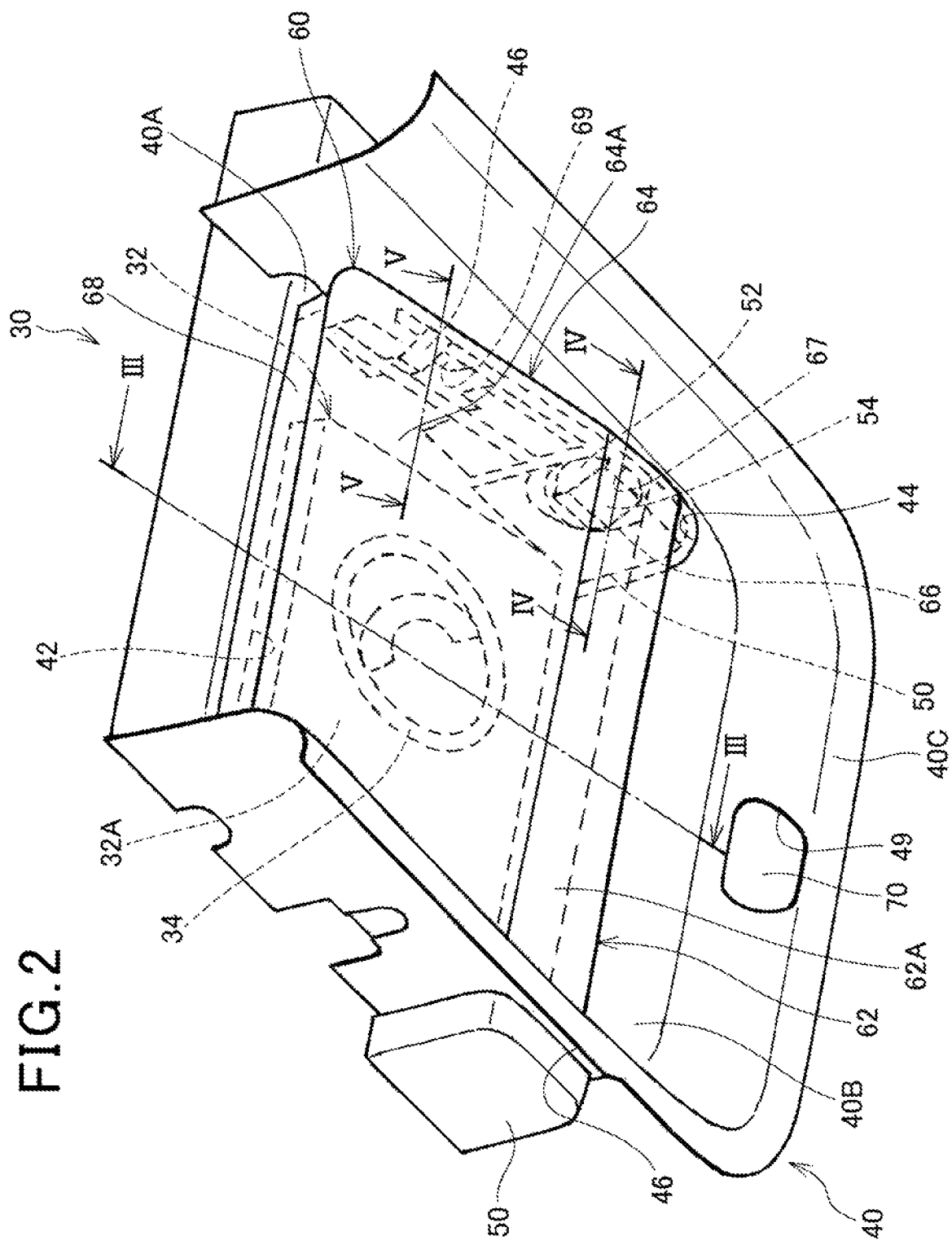
FIG. 2 is a perspective view of an emergency call switch.

FIG. 2 is a perspective view of the emergency call switch 30, and FIG. 3 is a longitudinal cross-sectional view taken along the III-III line of FIG. 2. Note that for the convenience of description, FIG. 2 omits the operation panel 10 excluding an emergency call operation element storage part 40. Furthermore, for the convenience of description, FIG. 3 shows an emergency call display 34 with a broken line.

The emergency call switch 30 is provided in a central part of the control device 1. The emergency call switch 30 is one of the plurality of switches 12 provided in the control device 1, and the emergency call switch 30 is operated by the occupant in case of emergency, thereby enabling report to police, fire department or the like.

As shown in FIG. 2 and FIG. 3, the emergency call switch 30 comprises an emergency call operation element 32, the light source 21 and a cover 60.

The emergency call operation element 32 of the present embodiment is a member molded in a form of a box called the knob. The emergency call operation element 32 is stored in the emergency call operation element storage part 40 that is one of the plurality of operation element storage parts 16 in the same manner as in the other switches 12. The emergency call operation element 32 is inserted into an opening 42 provided in a bottom surface 40A of the emergency call operation element storage part 40, and protrudes from the opening 42 with a height dimension smaller than a height dimension of a dent of the emergency call operation element storage part 40 to such an extent that the operation element does not protrude outward from the dent.

As shown in FIG. 3, an operation surface 32A located in a top surface of the emergency call operation element 32 is provided in a front-back direction of the vehicle, and inclined at a predetermined angle of an upward gradient from a vehicle front toward a vehicle rear. That is, the operation surface 32A is provided toward the occupant.

The emergency call display 34 is provided in the operation surface 32A of the emergency call operation element 32. The emergency call display 34 is molded in a form of a symbol or a letter representing an emergency call in the same manner as in the other display 22, and is formed so that light from the light source 21 provided in a rear surface of the emergency call operation element 32 can be transmitted.

Since the operation surface 32A is provided toward the occupant as described above, the emergency call display 34 is similarly provided toward the occupant. Consequently, in a case where the occupant sees the emergency call display 34, distortion of the emergency call display 34 can be suppressed, and visual recognition can improve.

Figure 4:
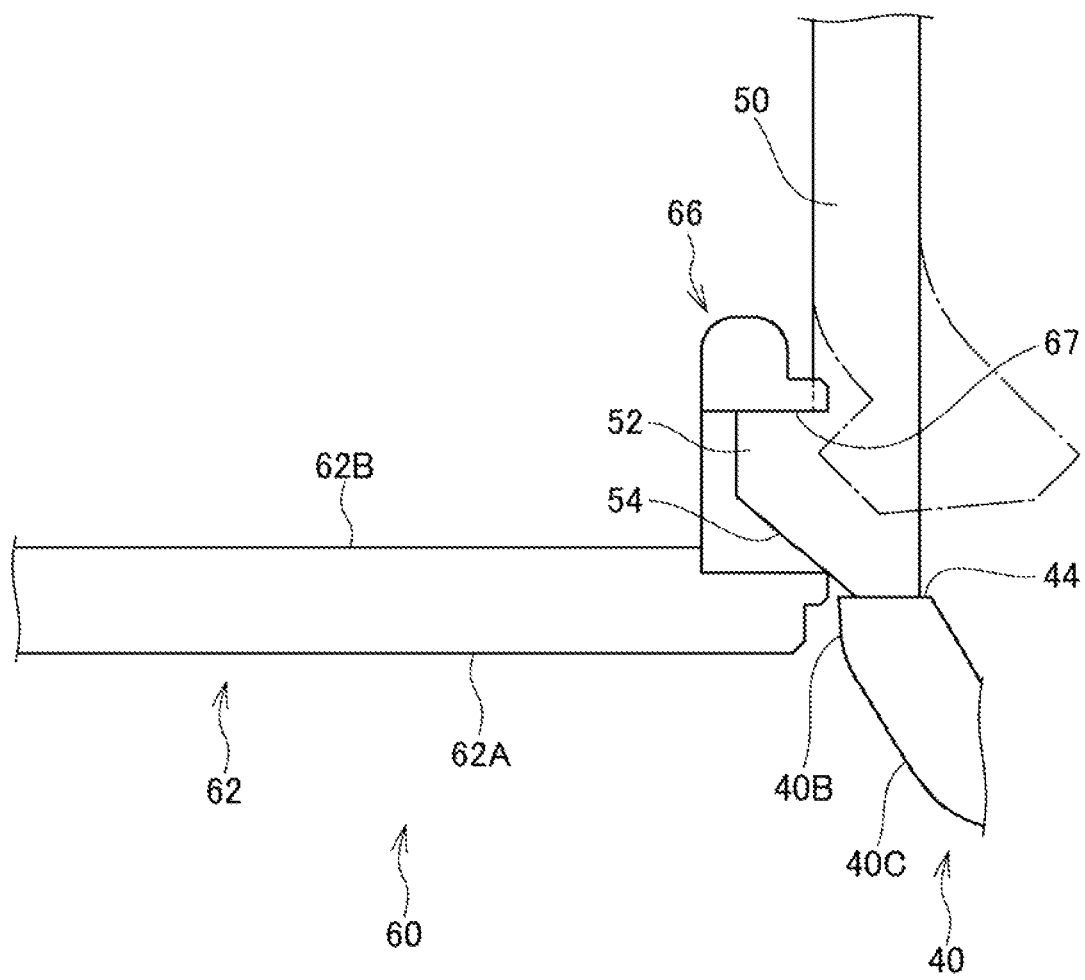
FIG. 4 is a longitudinal cross-sectional view taken along the IV-IV line of FIG. 2.
Figure 5:
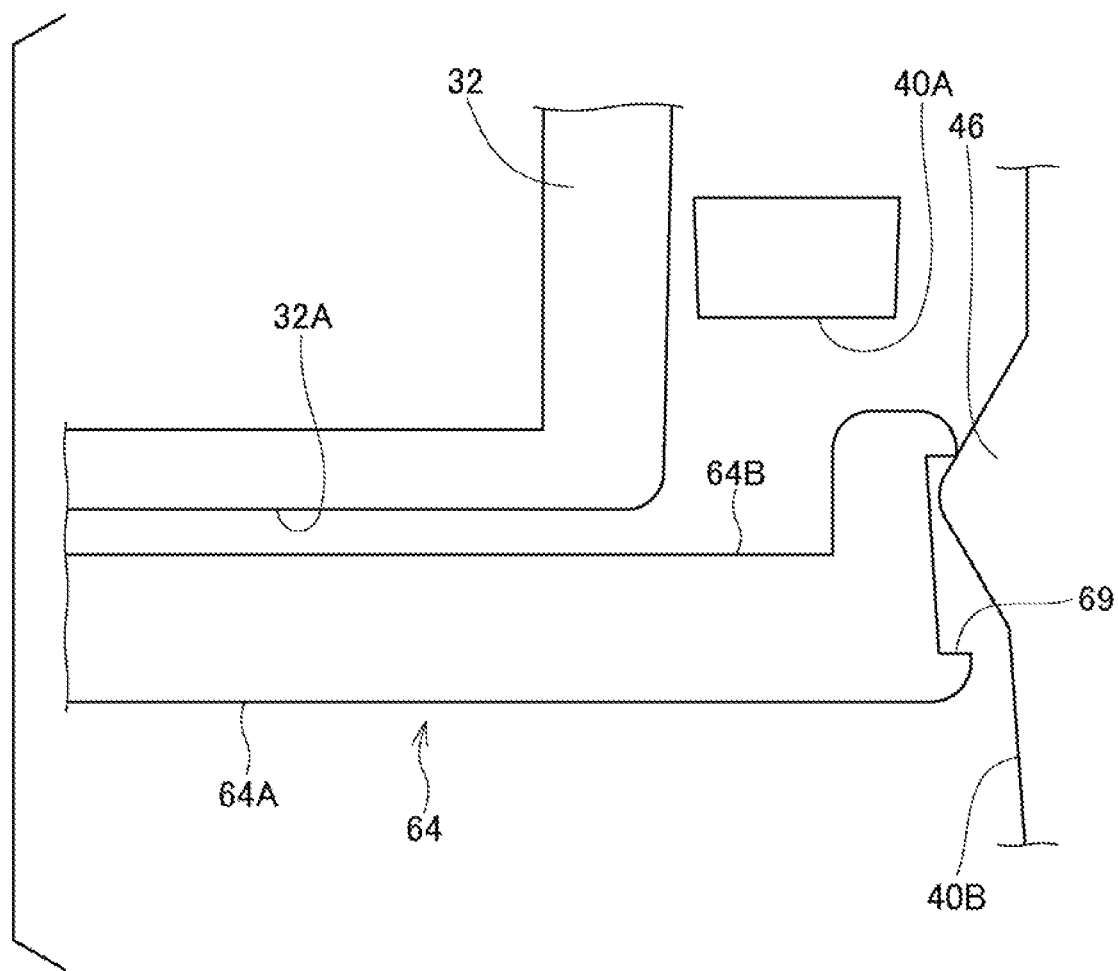
FIG. 5 is a longitudinal cross-sectional view taken along the V-V line of FIG. 2.

FIG. 4 is a longitudinal cross-sectional view taken along the IV-IV line of FIG. 2, and FIG. 5 is a longitudinal cross-sectional view taken along the V-V line of FIG. 2.

Here, the emergency call operation element storage part 40 is described in detail, and the emergency call operation element storage part 40 comprises the bottom surface 40A, a side surface 40B, and a continuous surface 40C.

The bottom surface 40A has a central part in which an opening 42 is provided.

The side surface 40B is vertically provided downward from the bottom surface 40A, and disposed facing each side surface of the emergency call operation element 32 to surround the emergency call operation element 32.

The continuous surface 40C couples the side surface 40B and the operation panel 10, and the continuous surface 40C is formed as a curved surface having a downwardly protruding shape in cross-sectional view in an up-down direction.

Furthermore, in the emergency call operation element storage part 40, as shown in FIG. 4 and FIG. 5, a pair of support insertion holes 44, a pair of engaging portions 46, a stopper 48, and an indicator communication hole 49 are provided.

As shown in FIG. 4, the pair of support insertion holes 44 are provided in the side surface 40B of the emergency call operation element storage part 40, and each of the support insertion holes 44 faces each of the side surfaces of the emergency call operation element 32 that is located in a width direction of the vehicle. Furthermore, each of the support insertion holes 44 is disposed at a position close to the side surface of the emergency call operation element 32 that is located on a rear side of the vehicle.

A support 50 is inserted into each of the support insertion holes 44. Each support 50 is a member formed as a flat plate, and these supports 50 are vertically provided on the bottom surface 40A of the emergency call operation element storage part 40. Furthermore, the respective supports 50 have flexibility.

A protruding portion 52 is provided on the side surface of each of the supports 50 that faces the emergency call operation element 32.

Each protruding portion 52 protrudes in the vehicle width direction along a width to such an extent that the protruding portion does not come in contact with the emergency call operation element 32, and the protruding portion 52 has a lower end side including a tip inclined portion 54.

The tip inclined portion 54 is an inclined surface inclined at an upward gradient toward a tip of the protruding portion 52, and the tip inclined portion 54 forms a lower surface of the protruding portion 52 in the up-down direction. That is, the protruding portion 52 is formed so that a width dimension in the up-down direction decreases as being toward the tip.

Note that each protruding portion 52 is located behind the emergency call operation element 32 in side view in the vehicle width direction of the emergency call operation element 32.

The pair of engaging portions 46 are provided on the side surface 40B of the emergency call operation element storage part 40. Each of the engaging portions 46 has a protruding shape protruding toward each side surface of the emergency call operation element 32 that is located in the width direction of the vehicle along a width to such an extent that the engaging portion does not come in contact with the emergency call operation element 32.

Each engaging portion 46 is disposed at a position opposite to a front side of the side surface of the emergency call operation element 32 in the front-back direction of the vehicle.

The stopper 48 is provided on the bottom surface 40A of the emergency call operation element storage part 40, and the stopper 48 is disposed adjacent to the side surface of the emergency call operation element 32 that is located on the rear side of the vehicle. The stopper 48 has a protruding shape protruding downward along the side surface of the emergency call operation element 32 that is located on the rear side of the vehicle. The stopper 48 is formed to have a height to such an extent that a tip of the protruding shape does not protrude downward from the operation surface 32A of the emergency call operation element 32.

Consequently, the stopper 48 is hidden behind the rear surface of the emergency call operation element 32, and disposed so that the stopper is not visually recognized by the occupant.

The stopper 48 includes an abutment inclined portion 48A inclined at an upward gradient from a tip of the protruding shape toward the rear side of the vehicle. The abutment inclined portion 48A is an inclined surface formed as a flat surface, and the abutment inclined portion 48A forms a lower surface of the stopper 48 in the up-down direction.

The indicator communication hole 49 is a through hole that communicates with the indicator 14, and the indicator communication hole 49 is provided in the continuous surface 40C. The light emitter 70 is exposed from the indicator communication hole 49, so that the light emitter 70 can be visually recognized by the occupant.

Next, the cover 60 will be described.

As shown in FIG. 2 and FIG. 3, the cover 60 is a member that covers the emergency call operation element 32 to inhibit an incorrect operation of the emergency call switch 30, and the cover 60 is stored in the emergency call operation element storage part 40. The cover 60 is formed as a plate, and the cover 60 has such a width that the cover can cover the whole operation surface 32A of the emergency call operation element 32 in each of the vehicle front-back direction and the vehicle width direction.

The cover 60 is formed of an entirely transparent member. Consequently, even in a state where the emergency call operation element 32 is covered with the cover 60, the occupant can visually recognize the emergency call operation element 32 without being obstructed by any region of the cover 60. Therefore, visual recognition of an interior of the cover 60 can improve.

The cover 60 comprises a flat plate 62 and an inclined portion 64.

The flat plate 62 covers a rear end of the emergency call operation element 32 in the front-back direction of the vehicle, and further extends rearward from the emergency call operation element 32. Furthermore, the flat plate 62 is formed almost in parallel with the operation panel 10 in a state where the emergency call operation element 32 is covered with the cover 60. The flat plate 62 has a uniform thickness dimension.

On opposite side surfaces of the flat plate 62 in the vehicle width direction, fitting portions 66 are provided, respectively. Each of the fitting portions 66 is molded in an annular form, and each fitting portion 66 has an insertion hole 67 extending through the portion in the vehicle width direction. The protruding portion 52 is inserted into each insertion hole 67.

Consequently, the cover 60 is pivotably supported by the protruding portion 52 of each support 50. That is, the cover 60 is openable and closable about each protruding portion 52 that serves as a rotary shaft, between a closed position to cover the emergency call operation element 32 and an opened position to open the emergency call operation element 32.

As described above, each of the supports 50 has flexibility, and each of the protruding portions 52 includes the tip inclined portion 54. Consequently, when a top surface 62A of the flat plate 62 is depressed with a predetermined pressure, each of the supports 50 is bent outward in the vehicle width direction, and each of the fitting portions 66 moves upward along each tip inclined portion 54. Afterward, each protruding portion 52 falls out of the insertion hole 67. Consequently, the cover 60 is released from a supported state held by a pair of protruding portions 52, and drops off.

Consequently, the emergency call operation element 32 is exposed and operable.

Thus, the top surface 62A of the flat plate 62 of the cover 60 is depressed with the predetermined pressure, so that the cover 60 can be immediately removed and the emergency call operation element 32 can be opened, for example, in case of emergency.

Note that, in the present embodiment, the cover 60 is formed so that the cover does not drop off in a case where the top surface 62A of the flat plate 62 receives a load having an amount less than a predetermined amount and so that the cover drops off in a case where the surface receives the predetermined amount of load or more. This can inhibit the emergency call switch 30 from being operated in case of non-emergency.

Furthermore, the emergency call operation element 32 is disposed so that the element is not operated in a case where the top surface 62A of the flat plate 62 is depressed.

In a case where the cover 60 is disposed in the opened position, a surface located at a rear end of the flat plate 62 in the front-back direction of the vehicle, that is, a rear end face 60A of the cover 60 abuts on the abutment inclined portion 48A of the stopper 48. That is, the cover 60 is stopped from rotating by the stopper 48.

Consequently, in the case where the cover 60 is disposed in the opened position, the cover 60 is inhibited from being in contact with the emergency call operation element 32. Consequently, the cover 60 and the emergency call operation element 32 can have improved durability.

The inclined portion 64 has a rear end connected to a front end of the flat plate 62, and has a front end extending to a position that covers a front side of the emergency call operation element 32, in a case where the cover 60 is disposed in the closed position.

Furthermore, the inclined portion 64 has a rear surface 64B provided along the operation surface 32A of the emergency call operation element 32 in the case where the cover 60 is disposed in the closed position. Consequently, the rear surface 64B is formed to incline upward at a predetermined angle from a rear surface 62B of the flat plate 62. Specifically, the rear surface 64B is inclined at the upward gradient from the vehicle front toward the vehicle rear in the front-back direction of the vehicle.

Similarly, a top surface 64A of the inclined portion 64 is formed to incline upward at a predetermined angle from the top surface 62A of the flat plate 62, and the top surface 64A is inclined at the upward gradient from the vehicle front toward the vehicle rear in the front-back direction of the vehicle.

That is, the inclined portion 64 is connected to the flat plate 62 to form the predetermined angle. Consequently, the inclined portion 64 is formed to incline upward at the predetermined angle to the operation panel 10.

The front end of the inclined portion 64 in the front-back direction of the vehicle includes a front-end abutment 68 protruding to a rear surface 64B side of the inclined portion 64. The front-end abutment 68 is provided at the whole front end of the inclined portion 64 in the vehicle width direction. When the cover 60 is disposed in the closed position, the front-end abutment 68 abuts on the bottom surface 40A of the emergency call operation element storage part 40. At this time, the operation surface 32A of the emergency call operation element 32 and the rear surface 64B of the inclined portion 64 opposite to the operation surface 32A are arranged via a predetermined gap. Consequently, the cover 60 can cover the emergency call operation element 32 without coming in contact with the emergency call operation element 32.

Grooves 69 are provided in opposite side surfaces of the inclined portion 64 that are located in the vehicle width direction, respectively. Each of the grooves 69 is molded in a groove form dented inward in the vehicle width direction, and each groove 69 is formed to extend in the front-back direction of the vehicle.

In the case where the cover 60 is disposed in the closed position, the grooves 69 engage with the engaging portions 46, respectively. Consequently, the cover 60 is fixed in the closed position.

When operating the emergency call operation element 32, a front end of the cover 60 in the front-back direction of the vehicle is drawn out downward with a predetermined force, the engaging portions 46 can be accordingly released from the grooves 69, respectively, and the cover 60 can be rotated and disposed in the opened position.

The inclined portion 64 has a thickness dimension decreased on the front side and increased on the rear side of the vehicle in the front-back direction of the vehicle. Consequently, the inclined portion 64 is provided in this thickness dimension so that the rear surface 64B has a predetermined angle to the top surface 64A of the inclined portion 64 in the front-back direction of the vehicle. That is, the top surface 64A and rear surface 64B of the inclined portion 64 are inclined at different angles of the upward gradient from the vehicle front toward the vehicle rear, respectively.

Consequently, in the case where the cover 60 is disposed in the closed position, light K from the light source 21 is emitted from the emergency call display 34, then transmitted through the cover 60 and thereby refracted. The refracted light K is directed in an emission direction from the emergency call display 34 toward the rear side in the front-back direction of the vehicle. That is, the light K is emitted from the cover 60 in a direction away from the rear-view mirror 2.

Thus, the light K is transmitted through the cover 60, so that the light K can be inhibited from being reflected in the rear-view mirror 2.

Note that, in the cover 60 of the present embodiment, the thickness dimension of the inclined portion 64 on the rear side is about the same as the thickness dimension of the flat plate 62.

In the present embodiment, when the emergency call switch 30 is not operated, the cover 60 is disposed in the closed position. At this time, external light from a windshield or the like, or reflected light of the external light reflected by the dashboard or the instrument panel may be directed to the operation panel 10 of the control device 1.

As described above, the cover 60 comprises the inclined portion 64 inclined at the upward gradient from the vehicle front toward the vehicle rear in the case where the cover is disposed in the closed position.

Consequently, the reflected light from the dashboard or the instrument panel or the external light from the windshield or the like can be inhibited from being radiated to the top surface 64A of the inclined portion 64 of the cover 60. Furthermore, in a case where the cover 60 is irradiated with the external light or the reflected light, total reflection by the top surface 64A of the inclined portion 64 of the cover 60 can be inhibited. Consequently, the occupant can always visually recognize the emergency call operation element 32 of the emergency call switch 30 via the cover 60.

According to the above described embodiment, such effects as described below are exhibited.

The emergency call switch 30 of the present embodiment is provided in the control device 1 of the vehicle ceiling part, and the emergency call switch 30 comprises the cover 60 that is openable and closable between the closed position to cover the emergency call operation element 32 and the opened position to open the element. Furthermore, the cover 60 comprises the inclined portion 64 formed of a member that transmits light, and inclined at the upward gradient from the vehicle front toward the vehicle rear in the closed position.

Consequently, in the case where the cover 60 is irradiated with the reflected light from the dashboard or the instrument panel or the external light from the windshield or the like, the total reflection by the top surface 64A of the inclined portion 64 of the cover 60 can be inhibited. Consequently, the occupant can always visually recognize the emergency call operation element 32 of the emergency call switch 30 via the cover 60.

Furthermore, according to the present embodiment, the cover 60 is formed of a member that entirely transmits light. Consequently, even in a state where the emergency call operation element 32 is covered with the cover 60, the occupant can visually recognize the emergency call operation element 32 without being obstructed by any region of the cover 60.

Additionally, according to the present embodiment, the control device 1 comprises the protruding portion 52 that protrudes inward in the vehicle width direction on each of the opposite sides in the vehicle width direction, the cover 60 comprises the fitting portion 66 that engages with and holds the protruding portion 52, and the cover 60 is openable and closable about the protruding portion 52 that serves as the rotary shaft. Consequently, the cover 60 is openable and closable about each protruding portion 52 that serves as the rotary shaft, between the closed position to cover the emergency call operation element 32 and the opened position to open the emergency call operation element 32.

Furthermore, according to the present embodiment, the stopper 48 that comes in contact with the cover 60 in the opened position is provided on the vehicle front side of the operation element. Consequently, in the case where the cover 60 is disposed in the opened position, the cover 60 can be inhibited from being in contact with the emergency call operation element 32, and the cover 60 and the emergency call operation element 32 can have improved durability.

Additionally, according to the present embodiment, the protruding portion 52 comprises the tip inclined portion 54 inclined at the upward gradient from an outer side toward an inner side in the vehicle width direction. Consequently, when the top surface 62A of the flat plate 62 of the cover 60 is depressed, the cover 60 can be immediately removed and the emergency call operation element 32 can be opened, for example, in case of emergency.

Furthermore, according to the present embodiment, in the operation surface 32A of the emergency call operation element 32, the emergency call display 34 through which light is transmittable is provided, and on a back side of the operation surface 32A, the light source 21 that illuminates the emergency call display 34 is provided. Consequently, the occupant can visually recognize the emergency call operation element 32 even in the dark place.

Additionally, according to the present embodiment, the cover 60 has the plate thickness decreased toward the vehicle front. Consequently, the light K is transmitted through the cover 60 and thereby refracted, and the light K can be inhibited from being reflected in the rear-view mirror 2.

Furthermore, according to the present embodiment, the operation surface 32A of the emergency call operation element 32 is inclined at the upward gradient from the vehicle front toward the rear. Consequently, in the case where the occupant sees the emergency call display 34, the distortion of the emergency call display 34 can be suppressed, and the visual recognition can improve.

Additionally, according to the present embodiment, the cover 60 is provided in the emergency call switch 30. Consequently, the incorrect operation of the emergency call switch 30 can be inhibited.

Next, a modification of the present invention will be described.

Figure 6:
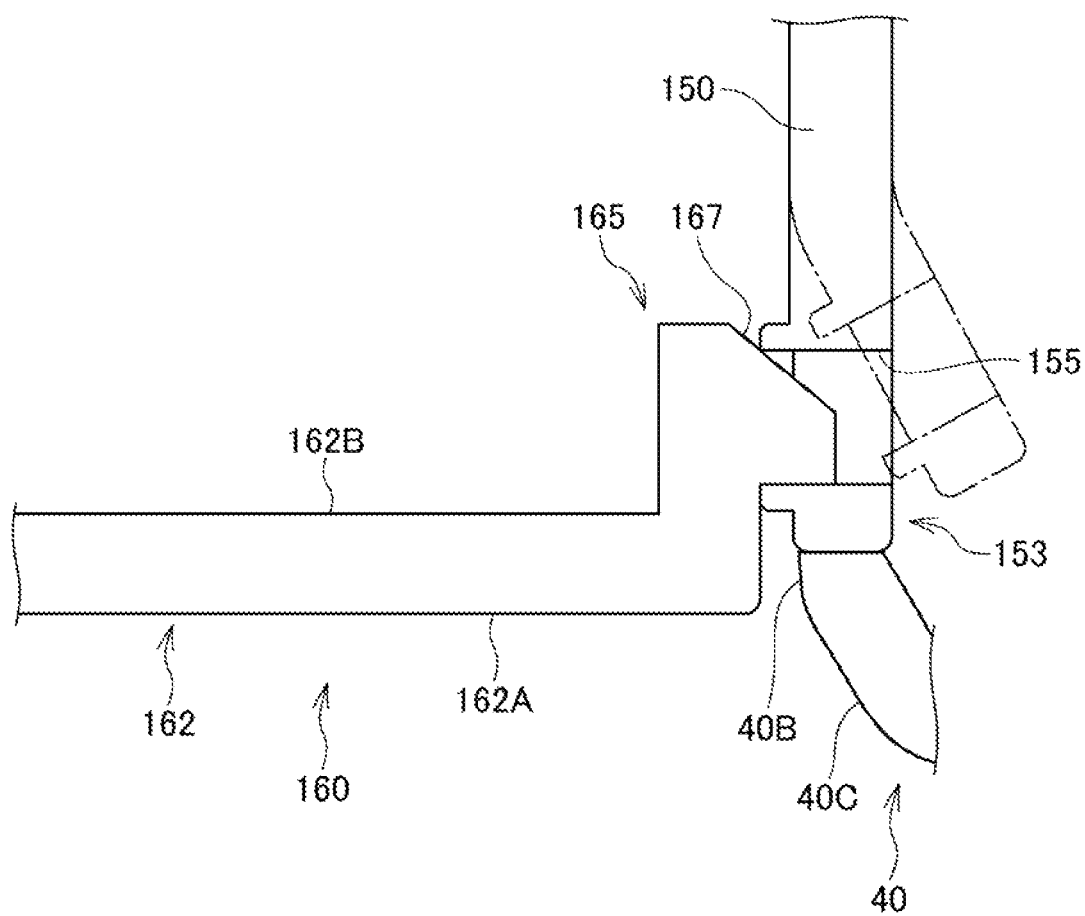
FIG. 6 is a longitudinal cross-sectional view of a protruding portion and a support taken along a vehicle width direction according to a modification of the present invention.

FIG. 6 is a longitudinal cross-sectional view of a protruding portion and a support taken along a vehicle width direction according to the modification of the present invention. In FIG. 6, the same part as in FIG. 4 is denoted with the same reference signs and description is omitted.

A control device 1 of the present modification is similar to the control device 1 of the above described embodiment, and is different in that a cover 160 comprises a pair of protruding portions 165 and each of supports 150 comprises a fitting portion 153.

The respective supports 150 of the present modification have flexibility, and have lower ends including the fitting portions 153, respectively, as shown in FIG. 6. Each of the fitting portions 153 comprises an insertion hole 155 extending through the portion in the vehicle width direction. Furthermore, in the cover 160, a flat plate 162 has opposite side surfaces in the vehicle width direction that include the protruding portions 165, respectively. Each of the protruding portions 165 protrudes in the vehicle width direction, and a tip inclined portion 167 is provided on an upper end side of each of the protruding portions 165.

The tip inclined portion 167 is an inclined surface inclined at a downward gradient toward a tip of the protruding portion 165, and the tip inclined portion 167 forms an upper surface of the protruding portion 165 in an up-down direction. That is, the protruding portion 165 is formed so that a width dimension in the up-down direction decreases as being toward the tip. The protruding portions 165 are inserted into the insertion holes 155, respectively.

Consequently, the cover 160 is rotatably supported by the respective supports 150.

As described above, the respective supports 150 have flexibility, and the protruding portions 165 include the tip inclined portions 167, respectively. Consequently, when a top surface 162A of the flat plate 162 is depressed, each of the protruding portions 165 moves upward, and each of the supports 150 is bent outward in the vehicle width direction along the tip inclined portion 167. Afterward, the protruding portions 165 fall out of the insertion holes 155, respectively. Consequently, the cover 160 is released from a supported state by a pair of supports 150, and drops off. Consequently, an emergency call operation element 32 is exposed and operable.

Thus, the top surface 162A of the flat plate 162 of the cover 160 is depressed, so that the cover 160 can be immediately removed and the emergency call operation element 32 can be opened, for example, in case of emergency.

Note that, in the present modification, each of the protruding portions 165 includes the tip inclined portion 167, but not limited to this, an inclined portion may be provided in each of the insertion holes 155. Furthermore, in this case, the tip inclined portion 167 does not have to be provided.

The above described embodiment illustrates one aspect of the present invention, and can be arbitrarily modified and applied without departing from a gist of the present invention.

In the above described embodiment, the operation surface 32A of the emergency call operation element 32 is inclined and provided, but not limited to this, the operation surface may be provided without being inclined.

Alternatively, the whole emergency call operation element 32 may be inclined so that the operation surface 32A is provided toward an occupant side.

In the above described embodiment, the switch 12 has the configuration where the operation element 20 is stored in the operation element storage part 16, but not limited to this, the operation element storage part 16 may not be provided, the opening 18 may be provided in the operation panel 10, and the operation element 20 may be inserted into the opening 18. Furthermore, in this case, the operation element 20 may have such a height dimension that the operation element does not protrude from the operation panel 10 and that the operation surface 20A forms about the same plane as in the operation panel 10.

Similarly, in the emergency call switch 30, the emergency call operation element storage part 40 may not be provided, the opening 42 may be provided in the operation panel 10, and the emergency call operation element 32 may be inserted into the opening 42.

Furthermore, in the above described embodiment, the light source 21 is provided in each operation element 20, and on the rear surface of the emergency call operation element 32, but not limited to this, illumination light may be guided from the light source provided at another position to each display 22 and the emergency call display 34 via a light guide material or the like.

Additionally, each display 22 and the emergency call display 34 are not limited to the member through which light is transmittable, and may be formed of, for example, a reflective material, a fluorescent material, or a phosphorescent material. In this case, each switch 12 or the emergency call switch 30 does not have to comprise the light source 21.

REFERENCE SIGNS LIST 1 control device
2 rear-view mirror
10 operation panel
12 switch
14 indicator
16 operation element storage part
18 and 42 opening
20 operation element
20A and 32A operation surface
21 light source
22 display
30 emergency call switch (switch structure)
32 emergency call operation element (operation element)
32A operation surface
34 emergency call display
40 emergency call operation element storage part
48 stopper
48A abutment inclined portion
50 and 150 support
52 and 165 protruding portion
54 and 167 tip inclined portion (second inclined portion)
60 and 160 cover
60A rear end face
62 and 162 flat plate
62A, 64A and 162A top surface
62B and 64B rear surface
64 inclined portion
66 and 153 fitting portion
67 and 155 insertion hole
90 vehicle ceiling part
K light

What is claimed is:

1. A switch structure provided in a control device of a vehicle ceiling part, comprising:

a cover that is openable and closable between a closed position to cover a switch and an opened position to open the switch, wherein in the cover, a region that covers an operation surface of an operation element of the switch in at least the closed position is formed of a member that transmits light, wherein the cover has an inclined portion that covers the operation surface of the operation element, the inclined portion including: a rear surface that faces the operation surface when the cover is in the closed position; and a top surface opposite to the rear surface, the inclined portion is arranged so as to have a predetermined gap between the rear surface of the inclined portion and the operation surface when the cover is in the closed position, and a thickness dimension of the inclined portion, between the rear surface of the inclined portion and the top surface of the inclined portion, increases from a vehicle front side toward a vehicle rear side in a front-back direction of the vehicle, and the top surface and the rear surface are respectively inclined at different angles of an upward gradient from the vehicle front side toward the vehicle rear side.

2. The switch structure according to claim 1, wherein the cover is formed of a member that entirely transmits light.

3. The switch structure according to claim 1, wherein the control device comprises a protruding portion that protrudes inward in a vehicle width direction on each of opposite sides in the vehicle width direction, the cover comprises a fitting portion that engages with and holds the protruding portion, and the cover is openable and closable about the protruding portion that serves as a rotary shaft.

4. The switch structure according to claim 1, wherein the cover comprises a protruding portion that protrudes outward in a vehicle width direction on each of opposite sides in the vehicle width direction, the control device comprises a fitting portion that engages with and holds the protruding portion, and the cover is openable and closable about the protruding portion that serves as a rotary shaft.

5. The switch structure according to claim 3, wherein the protruding portion comprises a second inclined portion inclined at an upward gradient from an outer side toward an inner side in the vehicle width direction.

6. The switch structure according to claim 1, wherein the control device comprises a stopper that comes in contact with the cover in the opened position on the vehicle front side of the operation element.

7. The switch structure according to claim 1, wherein in the operation surface, a display through which light is transmittable is provided, and on a back side of the operation surface, a light source that illuminates the display is provided.

8. The switch structure according to claim 1, wherein the switch is inclined at the upward gradient from the vehicle front side toward the vehicle rear side.

9. The switch structure according to claim 1, wherein the switch is an emergency call switch.

10. The switch structure according to claim 1, wherein the top surface and the rear surface are respectively inclined at different angles of the upward gradient from the vehicle front side toward the vehicle rear side so that the thickness dimension increases gradually from the vehicle front side toward the vehicle rear side in the front-back direction of the vehicle.

\* \* \* \* \*